US010388255B2

(12) United States Patent
Thakur et al.

(10) Patent No.: US 10,388,255 B2
(45) Date of Patent: Aug. 20, 2019

(54) COMPUTERS FOR SUPPORTING MULTIPLE VIRTUAL REALITY DISPLAY DEVICES AND RELATED METHODS

(71) Applicant: Intel Corporation, Santa Clara, CA (US)

(72) Inventors: Anshuman Thakur, Beaverton, OR (US); DongHo Hong, Portland, OR (US); Karthik Veeramani, Hillsboro, OR (US); Arvind Tomar, Folsom, CA (US); Brent Insko, Portland, OR (US); Atsuo Kuwahara, Portland, OR (US); Zhengmin Li, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/024,153

(22) Filed: Jun. 29, 2018

(65) Prior Publication Data

US 2019/0043448 A1    Feb. 7, 2019

(51) Int. Cl.
  *G09G 5/12*  (2006.01)
  *A63F 13/26*  (2014.01)
  *G06T 1/20*  (2006.01)
  *G09G 5/00*  (2006.01)
  *G02B 27/01*  (2006.01)

(52) U.S. Cl.
  CPC .............. *G09G 5/12* (2013.01); *A63F 13/26* (2014.09); *G02B 27/017* (2013.01); *G06T 1/20* (2013.01); *G09G 5/003* (2013.01); *A63F 2300/8082* (2013.01); *G09G 2360/18* (2013.01); *G09G 2370/16* (2013.01)

(58) Field of Classification Search
  None
  See application file for complete search history.

(56) References Cited

U.S. PATENT DOCUMENTS

| 7,808,447 B1 | 10/2010 | Cook |
| 9,858,637 B1 * | 1/2018 | Quach ................ G02B 27/017 |
| 2012/0274750 A1 * | 11/2012 | Strong ................ G01C 21/165 |
| | | 348/52 |

(Continued)

OTHER PUBLICATIONS

International Searching Authority, "International Search Report and Written Opinion", issued in connectio with International Application No. PCT/US2019/020272 dated Jun. 28, 2019, 13 pages.

*Primary Examiner* — Joni Richer
(74) *Attorney, Agent, or Firm* — Hanley, Flight & Zimmerman, LLC

(57) ABSTRACT

Computers for supporting multiple virtual reality (VR) display devices and related methods are described herein. An example computer includes a graphics processing unit (GPU) to render frames for a first VR display device and a second VR display device, a memory to store frames rendered by the GPU for the first VR display device and the second VR display device, and a vertical synchronization (VSYNC) scheduler to transmit alternating first and second VSYNC signals to the GPU such that a time period between each of the first or second VSYNC signals and a subsequent one of the first or second VSYNC signals is substantially the same. The GPU is to, based on the first and second VSYNC signals, alternate between rendering a frame for the first VR display device and a frame for the second VR display device.

20 Claims, 4 Drawing Sheets

(56) References Cited

U.S. PATENT DOCUMENTS

| | | | |
|---|---|---|---|
| 2013/0021352 A1* | 1/2013 | Wyatt | G09G 5/395 |
| | | | 345/520 |
| 2014/0026137 A1* | 1/2014 | Vembu | G06F 9/4881 |
| | | | 718/102 |
| 2015/0261291 A1 | 9/2015 | Mikhailov et al. | |
| 2016/0275905 A1* | 9/2016 | Sacchetto | G09G 5/006 |
| 2018/0307042 A1* | 10/2018 | Riguer | G02B 27/017 |

* cited by examiner

COMPUTERS FOR SUPPORTING MULTIPLE VIRTUAL REALITY DISPLAY DEVICES AND RELATED METHODS

FIELD OF THE DISCLOSURE

This disclosure relates generally to computers, and, more particularly, to computers for supporting multiple virtual reality display devices and related methods.

BACKGROUND

In recent years, virtual reality display devices, such as head-mounted displays, have been used to provide immersive gaming experiences for users. A head-mounted display, for example, includes display screens corresponding to each eye of a user to convey the illusion of movement or presence in a displayed environment. The head-mounted display is connected to a personal or host computer that runs or operates a VR game or application. The personal computer includes a graphics processing unit (GPU) that renders the frame sequence for the head-mounted display to create the virtual reality environment for the user.

Figure 1:
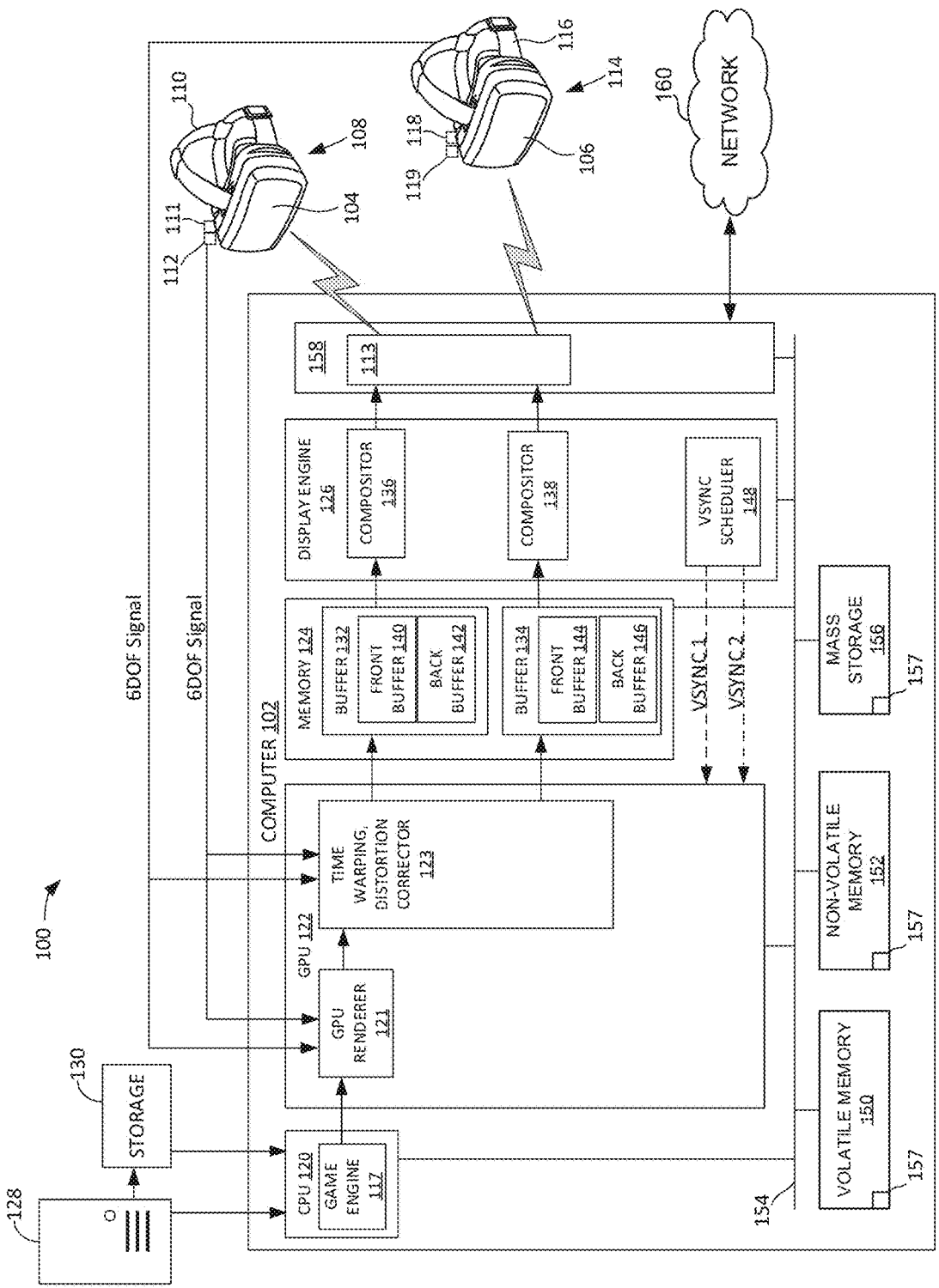
FIG. 1 is a schematic illustration of an example virtual reality (VR) system including an example computer capable of supporting multiple VR display devices.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Virtual reality (VR) gaming is becoming more social as players often desire to share their experience with friends and family members, instead of playing in an isolated environment. Currently, only one personal computer (PC) (sometimes referred to as a host computer) can support one VR display device, such as a head-mounted display (HMD). If multiple players desire to play the same game in the same room, each player has to use a separate PC to support their HMD.

PCs, such as gaming PCs, include a graphics processing unit (GPU) that renders the frames for the VR display device. In general, VR gaming has a high demand of GPU rendering capability to generate the high resolution and high frame rate content with low motion to photon latency.

Because GPUs are often capable of rendering images at a higher frames-per second (FPS) rate than the refresh rate of the VR display device, many PCs utilize a vertical synchronization (VSYNC) signal to synchronize the GPU processing with the refresh rate of the VR display device. For example, displays or monitors operate at a certain refresh rate. The refresh rate is the number of times the display updates per second. Most displays have a refresh rate of 60 Hertz (Hz), but other displays can have higher refresh rates, such as 120 Hz or higher. The GPU is capable of independently rendering frames at a particular FPS rate, which is often higher than the refresh rate of the corresponding display. For example, the refresh rate of a display may be 60 Hz, while the GPU may be able to render frames at 120 FPS (or higher). The frames rendered by the GPU are stored in a frame buffer. However, if the GPU is not synchronized with the display, the GPU may render multiple frames during one display refresh, which causes a visual effect known as tearing.

Therefore, known gaming PCs utilize a VSYNC signal, which is generated by a display engine at the same frequency as the refresh rate of the display, such that VSYNC signals are synchronized with the refresh timing. The VYSNC signals are automatically sent at the same frequency as the refresh rate without input. The GPU renders one frame each time the GPU receives the VSYNC signal, thereby preventing the GPU from rendering frames faster than the refresh rate of the display, thereby eliminating tearing.

However, if a GPU is trying to support two VR display devices at the same time, each display device has an independent VSYNC signal. The VSYNC signals are received by the GPU randomly and in an unpredicted manner. The GPU does not have the intelligence of regulating multiple rendering tasks. As a result, the GPU renders the frames in a first-come, first-served manner based on the incoming VSYNC signals. In other words, if the GPU is rendering a frame for a first display device while a VSYNC signal for a second display device is received, the GPU finishes rendering the frame for the first display device. As such, GPU resources are not shared evenly, which results in dropped frames, longer latency, interrupted rendering order, etc.

Disclosed herein are example computers that are capable of effectively supporting multiple VR display devices (e.g., two HMDs) without the above-noted disadvantages or shortcomings. An example computer disclosed herein includes a GPU that alternates between rendering a frame for a first VR display device and rendering a frame a second VR display device. The GPU alternates at a specific interval or frequency such that the time for each rendering process is divided evenly. In other words, each time slot for rendering a frame for the first VR display device is substantially the same as each time slot for rendering a frame for a the second VR display device. In some examples, the interval or frequency is double the refresh rate of the VR display devices. As such, the GPU can efficiently render frames at the corresponding refresh rate for each of the two display devices.

In some examples, the GPU is triggered to alternate (switch) back-and-forth based on received alternating first and second VSYNC signals. In particular, in some examples, the computer includes a VSYNC scheduler that transmits alternating first and second VSYNC signals to the GPU. The VSYNC scheduler may be implemented by a display engine of the computer. When the GPU receives one of the first VSYNC signals (corresponding to the first VR display device), the GPU renders a frame for the first VR display device, and when the GPU receives one of the second VSYNC signals (corresponding to the second VR display device), the GPU renders a frame for the second VR display device. The VSYNC scheduler transmits alternating first and second VSYNC signals at a particular frequency, thereby enabling the GPU to alternate between rendering a frame for a first VR display device and rendering a frame for a second VR display device. If the GPU finishes rendering a frame for the first VR display device before the VSYNC signal for the second VR display device is received, the GPU may enter an idle or sleep state and wait until the next VSYNC signal is received. If, however, the GPU has not finished rendering a frame when the VSYNC signal for the second VR display device is received, the GPU may cease rending the frame for the first VR display device and instead switch over to rendering a frame for the second VR display device. In this scenario, the first VR display device continues to display the previous frame during the next refresh. Then, when the GPU receives the next VSYNC signal for the first VR display device, the GPU can finish rendering the frame. This technique enables an efficient use of the GPU to support both VR display devices. Thus, by interleaving the VSYNC signals, the example computers disclosed herein regulate the VSYNC timing of the VR display devices to force the GPU to start rendering for different VR display devices at different times.

FIG. 1 is a schematic illustration of an example VR system 100 including an example computer 102 (which may be referred to as a host computer) constructed in accordance with the teachings of this disclosure. The example computer 102 may be implemented as, for example, a personal computer (PC) (e.g., a desktop computer) (which may be referred to as a host computer), a gaming console, such as the Microsoft® Xbox®, the Nintendo® Wii® and Wii U®, or the Sony® PlayStation® console, a work station, a mobile device (e.g., a cell phone, a smart phone, a tablet such as an iPad™), a personal digital assistant (PDA), a DVD player, a CD player, a digital video recorder, a Blu-ray player, or any other type of computing device. The computer 102 is capable of supporting multiple VR display devices at the same time to experience the same VR game or application. A VR display device may include, for example, an HMD, a handheld device, such as a phone or tablet, a computer, etc. In the illustrated example, the computer 102 is supporting a first HMD 104 (e.g., portable screen goggles, display goggles) and a second HMD 106. In other examples, the computer 102 can support more than two VR display devices. The first and second HMDs 104, 106 are communicatively coupled (e.g., via a wireless communication protocol) to the computer 102. The first HMD 104 can be worn by a first user and the second HMD 106 can be worn by a second user. The first and second users can be located in the same room or building, for example. The computer 102 processes and renders a VR game or application for both the first and second HMDs 104, 106.

In the illustrated example, the first HMD 104 is part of a first headset 108. The first headset 108 includes a first headband 110 to hold the first HMD 104 in place relative to a head of the first user. The first HMD 104 may be translated and/or rotated as the first user moves his/her head (e.g., while turning around, while moving through a room, while looking in different directions, etc.). To track the location, orientation, and/or movement of the first HMD 104, the first headset 108 includes one or more sensor(s) 111. The sensor(s) 111 may include, for example, an accelerometer. Additionally or alternatively, the sensor(s) 111 can include one or more other sensors or devices such as a gyroscope, a magnetometer, a camera, etc. In some examples, the sensor(s) 111 generate(s) a six degrees of freedom (6DOF) signal, which indicates the position of the first HMD 104 in the three axes (XYZ) and the rotational position or orientation of the first HMD 104 about each of three axes (referred to as pitch, roll and yaw). As a wearer of the first HMD 104 moves, the 6DOF signals are transmitted back to the computer 102. The 6DOF signals can be used to determine the location, orientation, and/or movement of the first user's head. Based on the location, orientation, and/or movement information, the computer 102 renders and transmits the images to be displayed on the first HMD 104, thereby creating a VR environment that can be experienced by the first user.

In this example, the first HMD 104 is wirelessly communicatively coupled to the computer 102. The first HMD 104 includes a first wireless transceiver 112 that communicates with a computer wireless transceiver 113 of the computer 102. The first wireless transceiver 112 and the computer wireless transceiver 113 may communicate data using any type of wireless communication protocol (e.g., Bluetooth®, WiFi, WiGig, near field communication (NFC), etc.). The first wireless transceiver 112 may wirelessly transmit the 6DOF signals to the computer 102, and the computer wireless transceiver 113 may transmit the frames to be displayed to the first HMD 104.

In the illustrated example, the second HMD 106 is substantially the same as the first HMD 104. In particular, the second HMD 106 is part of a second headset 114 that includes a second headband 116 for holding the second HMD 106, one or more sensor(s) 118 for tracking position and/or movement of the second HMD 106, and a second wireless transceiver 119 to communicate with the computer wireless transceiver 113. While in the illustrated example the first and second HMDs 104, 106 communicate wirelessly with the computer 102, in other examples the first and/or second HMDs 104, 106 may be communicatively coupled to the computer 102 via one or more cables or wires.

The first and second VR display devices (e.g., the first and second HMDs 104, 106) may be a same type or brand of VR display device or a different type or brand of VR display device. In other words, the size, resolution, etc. of the VR display devices may be the same or different. For example, the first headset 108 may be an Oculus Rift™ headset and the second headset 114 may be an HTC VIVE™ headset. As such, the first VR display device can be a different type of VR display device than the second VR display device.

In the illustrated example, the computer 102 includes a central processing unit (CPU) 120, a graphics processing unit (GPU) 122, a memory 124, a display engine 126, and the computer wireless transceiver 113, which are all communicatively coupled. In some examples, the CPU 120, the GPU 122, the memory 124, the display engine 126, and the computer wireless transceiver 113 are all disposed within the same chassis (e.g., housing, casing, etc.) of the computer 102. The CPU 120, the GPU 122, and the display engine 126 are hardware, which can be implemented by one or more integrated circuits, logic circuits, microprocessors, or controllers from any desired family or manufacturer. These hardware devices can be semiconductor based (e.g., silicon based) devices.

The computer 102 may operate or run a VR game or application. The CPU 120 implements a game engine 117 that receives and processes data corresponding to a VR environment. The game engine 117 maybe a software executed by the CPU 120, for example. In the illustrated example, the CPU 120 receives game data (for the VR game or application) from an online server 128 and/or a local storage device 130, such as a solid state drive (SSD), an optical disk (e.g., a digital versatile disk (DVD), a compact disk (CD), etc.), etc. The game engine 117 of the CPU 120 preprocesses the game data and sends rendering commands (e.g., Direct3D (D3D) calls) to the GPU 122.

Based on the game data and the orientation data from the first and second HMDs 104, 106 (e.g., from the sensor(s) 111, 118), the GPU 122 renders the frames (images) to be displayed on the first and second HMDs 104, 106. The GPU 122 implements a GPU renderer 121 that performs frame rendering and a time warping, distortion corrector 123 that performs post-processing takes on the frames such as time warping and distortion correction. The GPU renderer 121 and the time warping, distortion corrector 123 may be software executed by the GPU 122, for example.

In the illustrated example, the memory 124 includes a first buffer 132 for temporarily storing one or more frames rendered by the GPU 122 to be displayed via the first HMD 104 and a second buffer 134 for temporarily storing one or more frames rendered by the GPU 122 to be displayed via the second HMD 106. The GPU 122 writes or saves the frames for the first and second HMDs 104, 106 to the respective first and second buffers 132, 134. The memory 124 may be a local memory (e.g., a cache) for the GPU 122. The CPU 120 and/or the display engine 126 may also include local memories and/or may share a local memory with the GPU 122.

In the illustrated example, the display engine 126 includes a first compositor 136 for the first HMD 104 and a second compositor 138 for the second HMD 106. The first and second compositors 136, 138 provide off-screen buffering and/or perform additional processing for the frames, such as applying 2D and 3D animated effects such as blending, fading, scaling, etc. The first compositor 136 retrieves the frames, in sequence, from the first buffer 132 for the first HMD 104, performs one or more composition or processing tasks, and transmits the frames to the first HMD 104 (e.g., via the computer wireless transceiver 113, via one or more cables, etc.). Similarly, the second compositor 136 retrieves the frames, in sequence, from the second buffer 134 for the second HMD 106, performs one or more composition or processing tasks, and transmits the frames, via the computer wireless transceiver 113, to the second HMD 106.

In the illustrated example, the first buffer 132 includes a first front buffer 140 and a first back buffer 142 (sometimes referred to as a primary buffer and a second buffer, respectively). The GPU 122 renders and saves a single frame to each of the first front buffer 140 and the first back buffer 142 in an alternating manner. For example, assume a first frame is saved on the first front buffer 140. The display engine 126 reads the frame from the first front buffer 140 and transmits, via the computer wireless transceiver 113, the first frame to the first HMD 104 to be displayed via the first HMD 104. While the first HMD 104 is displaying the first frame, the GPU 122 renders the next, second frame and saves it to the first back buffer 142. Once the first frame is done being displayed or produced on the first HMD 104, and the first HMD 104 is to refresh, the first front and back buffers 140, 142 switch. As such, the display engine 126 then reading the second frame from the first back buffer 142 and transmitting, via the computer wireless transceiver 113, the second frame to the first HMD 104 to be displayed via the first HMD 104. While the second frame is being produced on the first HMD 104, the GPU 122 renders the next, third frame and saves it to the first front buffer 140, and so forth. This process continues at the refresh rate of the first HMD 104 (e.g., 60 Hz), switching back-and-forth between the first front and back buffers 140, 142. In other examples, the first buffer 132 may have more than two buffers.

The second buffer 134 similarly includes a second front buffer 144 and a second back buffer 146 for the second HMD 106. The GPU 122 (e.g., the GPU renderer 121 and the time warping, distortion corrector 123) renders and saves frames to the second front and back buffers 144, 146 in an alternating manner for the second HMD 106. The second compositor 138 reads the frames from the second front and back buffers 144, 146 in an alternating manner and transmits, via the computer wireless transceiver 113, the frames to the second HMD 106.

As mentioned above, in a conventional PC, a VSYNC signal is transmitted to the GPU 122 at a frequency that matches the refresh rate of the display. Each VSYNC signal triggers the GPU 122 to render the next frame and save it in the open or empty buffer. This effect prevents the GPU 122 from rendering multiple frames during one refresh.

With two display devices (e.g., the first HMD and the second HMD 104, 106), the VSYNC signals may be produced randomly, at an unpredicted interval. First VSYNC signals, referred to herein as VSYNC1 signals, are associated for the first HMD 104 and second VSYNC signals, referred to herein as VSYNC2 signals, are associated for the second HMD 106. If the GPU 122 receives a VSYNC1 signal for the first HMD 104, the GPU 122 renders a frame for the first HMD 104. If the GPU 122 is rendering a frame for the first HMD 104 when the GPU 122 receives a VSYNC2 signal, the GPU 122 may ignore the second VSYNC signal and continue to finish the frame for the first HMD 104. As a result, a frame for the second HMD 106 may not be created in time. As such, the previous frame for the second HMD 106 is displayed again, which is perceived as a lag. After the GPU 122 finishes rendering the frame for the first HMD 104, the GPU 122 waits for a subsequent VYSNC signal to be received. If another one of first VSYNC1 signals is received before one of the second VSYNC2 signals, the GPU 122 may again render a frame for the first HMD 104 without rendering a frame for the second HMD 106. This may occur multiple times in a row, which may cause significant lag in the rendering for the second HMD 106.

To regulate the VSYNC1 and VSYNC2 signals and enable the GPU 122 to efficiently render frames for both the first and second HMDs 104, 106, the example computer 102 includes a VSYNC scheduler 148. The VSYNC scheduler 148 transmits alternating VSYNC1 and VSYNC2 signals to the GPU 122 a constant interval or frequency. In other words, a time period between each VSYNC1 signal or VSYNC2 signal and a subsequent VSYNC1 signal or VSYNC2 signal is substantially the same. The GPU 122, based on the received VSYNC1 and VSYNC2 signals, switches back-and-forth between processing frames for the first HMD and processing frames for the second HMD. As such, the GPU 122 alternates between rendering frames for the first HMD 104 during first time slots and rendering frames for the second HMD 106 during second time slots, where each of the first time slots is substantially a same amount of time (e.g., ±0.1 ms) as each of the second time slots. In this example, the VSYNC scheduler 148 is implemented by the display engine 126. However, in other example, the VSYNC scheduler 148 may be implemented by another processor of the computer 102.

In some examples, the first and second HMDs 104, 106 have a same refresh rate, and the VSYNC scheduler 148 transmits the alternating VSYNC1 and VSYNC2 signals at a frequency that is double the refresh rate of the first and second HMDs 104, 106. As such, the GPU 122 can render frames in time for each of the two HMDs 104, 106. For example, assume the refresh rate for the first and second HMDs 104, 106 is 60 Hz (i.e., the screens refresh every 16 milliseconds (ms)). In such an example, the VSYNC scheduler 148 may transmit the alternating VSYNC1 and VSYNC2 signals at a constant frequency of 120 Hz. In other words, one of the VSYNC1 or VSYNC2 signals is transmitted every 8 ms.

Figure 2:
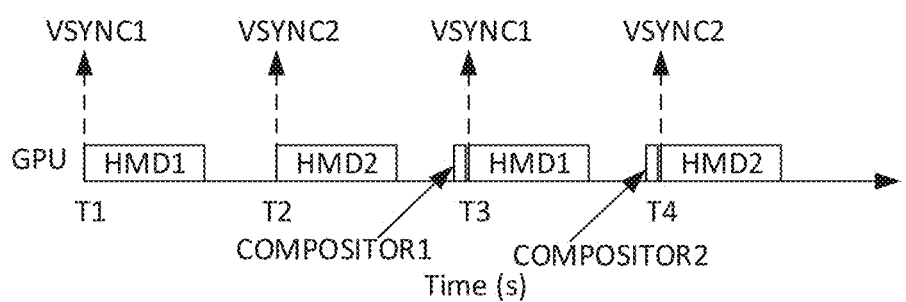
FIG. 2 is an example usage timeline for an example graphics processing unit (GPU) of the example computer of FIG. 1.

For example, FIG. 2 illustrates an example usage timeline for the GPU 122. At time T1 (e.g., 0 s), the GPU 122 receives a VSYNC1 signal from the VSYNC scheduler 148. Based on the received VSYNC1 signal, the GPU 122 renders a frame for the first HMD 104. The frame is written or saved to one of the first front or back buffers 140, 142 of the first buffer 132 (whichever one is not being currently read from). The GPU 122 renders the frame based on the game data from the CPU 120 and the location and/or orientation data provided by the sensor(s) 111 associated with the first HMD 104. Once the GPU 122 finishes rendering the frame, the GPU 122 may enter a sleep or idle state. Then, at time T2 (e.g., 8 ms), the GPU 122 receives a VSYNC2 signal from the VSYNC scheduler 148. Based on the received VSYNC2 signal, the GPU 122 starts rendering a frame for the second HMD 106 based on the game data from the CPU 120 and the location and/or orientation data from the second sensor(s) 118 associated with the second HMD 106. The frame is saved in one of the second front or back buffers 144, 146 of the second buffer 134 (whichever is not currently being read from). Again, once the GPU 122 finishes rendering the frame, the GPU 122 may remain idle. Then, at time T3 (e.g., 16 ms), the GPU 122 receives another VSYNC1 signal from the VSYNC scheduler 148. Based on the received VSYNC1 signal, the GPU 122 starts rendering the next frame for the first HMD 104, and so forth. In some examples, when the VSYNC1 signal is received at T3, the first compositor 136 (labeled COMPOSITOR1) starts post processing (e.g., time warping) the frame previously rendered by the GPU 122 for the first HMD 104, flips the first front and back buffers 140, 142 (so the GPU 122 is now saving the next frame in the empty buffer), and sends the frame to the first HMD 104.

As shown in FIG. 2, the time period or interval between each VSYNC1 signal or VSYNC2 signal and a subsequent VSYNC1 signal or VSYNC2 signal is the same. As such, the processing time of the GPU 122 is split evenly between the first and second HMDs 104, 106 (e.g., the GPU 122 renders a frame for 8 ms for each HMD in an alternating manner), which enables the same or common GPU 122 to support both of the first and second HMDs 104, 106. By using a frequency that is double the refresh rate, the GPU 122 can service each HMD at the proper time. For example, at time T1 (e.g., 0 s), the GPU 122 services the first HMD 104. Then, at time T3 (e.g., 16 s), the GPU 122 again services the first HMD 104. Thus, the GPU 122 renders frames for the first HMD 104 at the refresh rate of the first HMD 104 (e.g., 60 Hz or every 16 ms). Likewise, the GPU 122 renders frames for the second HMD 106 at the refresh rate of the second HMD 104. In other examples, the VSYNC scheduler 148 may transmit the alternating VSYNC1 and VSYNC2 signals at another frequency that is higher or lower than the refresh rates of the first and second HMDs 104, 106.

In the illustrated example of FIG. 2, the GPU 122 finishes rendering for the first HMD 104 prior to receiving the VSYNC2 signal (e.g., at T2). If the GPU 122 finishes rendering a frame prior to receiving the next VSYNC signal, the GPU 122 may enter a sleep or idle state, until the next VSYNC signal is received. However, in some instances, the GPU 122 may not be able to finish rendering a frame for one of the first or second HMDs 104, 106 within the allotted time slot such as, for example, when a relatively active screen is being displayed that requires more intensive and complex computations.

Figure 3:
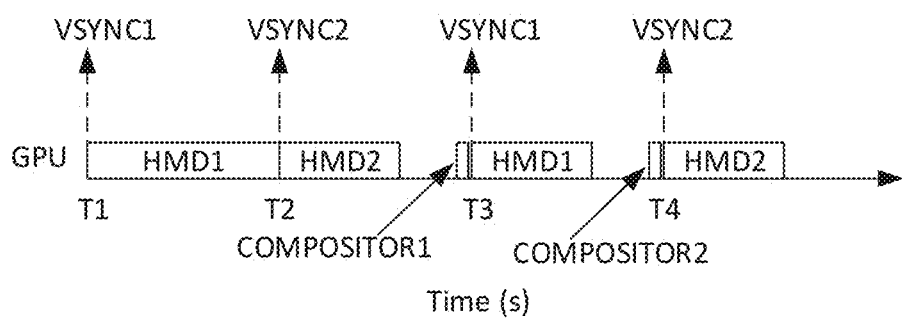
FIG. 3 is another example usage timeline for an example graphics processing unit (GPU) of the example computer of FIG. 1.

FIG. 3 illustrates another example usage timeline for the GPU 122. At time T1 (e.g., 0 s), the GPU 122 receives a VSYNC1 signal from the VSYNC scheduler 148. Based on the received VSYNC1 signal, the GPU 122 renders a frame for the first HMD 104. However, in this example, the GPU 122 has not yet finished rendering the frame when a VSYNC2 signal is received at T2 (e.g., 8 ms). In this example, the GPU 122 ceases rendering the frame for the first HMD 104. Instead, the GPU 122 begins rendering a frame for the second HMD 106 at T2 (i.e., the VSYNC2 signal pre-empts the rendering of the frame for the first HMD 104). When the GPU 122 receives the next VSYNC1 signal at T3 (e.g., 16 ms), the GPU 122 finishes rendering the previous frame where it left off. In this instance, the GPU 122 did not render a frame in time to be displayed on the first HMD 104. As such, the previous or current frame displayed on the first HMD 104 is displayed again. While this may create a lag in the display of the first HMD 104, this process ensures that the GPU 122 can continue supporting both the first and second HMD 104, 106 in an efficient manner.

Referring back to FIG. 1, the CPU 120, the GPU 122, the memory 124, the display engine 126 and the computer wireless transceiver 113 are in communication with a main memory including a volatile memory 150 and a non-volatile memory 152 via a bus 154. The volatile memory 150 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 152 may be implemented by flash memory and/or any other desired type of memory device. Access to the main memory 150, 152 is controlled by a memory controller. The example computer 102 of the illustrated example also includes one or more mass storage devices 156 for storing software and/or data. Examples of such mass storage devices 156 include floppy disk drives, hard drive disks, compact disk drives, Blu-ray disk drives, redundant array of independent disks (RAID) systems, and digital versatile disk (DVD) drives. Machine executable instructions 157, corresponding to FIGS. 5 and 6, may be stored in the mass storage device 156, in the volatile memory 150, in the non-volatile memory 152, and/or on a removable non-transitory computer readable storage medium such as a CD or DVD.

The example computer 102 of the illustrated example also includes an interface circuit 158 in communication with the bus 154. The interface circuit 158 may be implemented by any type of interface standard, such as an Ethernet interface, a universal serial bus (USB), a Bluetooth® interface, a near field communication (NFC) interface, and/or a PCI express interface. In this example, the interface circuit 158 may implement the computer wireless transceiver 113. One or more input devices may be connected to the interface circuit 158. The input device(s) permit(s) a user to enter data and/or commands into the computer 102. The input device(s) may include, for example, the sensor(s) 111 and/or the sensor(s) 118 (e.g., an accelerometer, a camera (still or video), a gyroscope, etc.) associated with the first and second HMDs 104, 106. While the 6DOF signal arrows are shown as leading directly to the GPU 122, the 6DOF signals may be transmitted through the computer wireless transceiver 113 to the GPU 122. Additionally or alternatively, the computer 102 may include one or more other input device(s), such as, for example, an audio sensor, a microphone, a keyboard, a button, a mouse, a touchscreen, a track-pad, a trackball, isopoint, and/or a voice recognition system.

The computer 102 may also include one or more output devices are connected to the interface circuit 158. The output device(s) can be implemented, for example, by the first and second HMDs 104, 106, which are display devices, such as a light emitting diode (LED), an organic light emitting diode (OLED), a liquid crystal display (LCD), a cathode ray tube display (CRT), an in-place switching (IPS) display, a touchscreen, etc., a tactile output device, a printer and/or speaker.

While in the illustrated example the interface circuit 158 includes the computer wireless transceiver 113, the interface circuit 158 may include one or more other communication devices such as a transmitter, a receiver, a modem, a residential gateway, a wireless access point, and/or a network interface to facilitate exchange of data with external machines (e.g., computing devices of any kind) via a network 160. The communication can be via, for example, an Ethernet connection, a digital subscriber line (DSL) connection, a telephone line connection, a coaxial cable system, a satellite system, a line-of-site wireless system, a cellular telephone system, etc. In some examples, the online server 128 may be implemented in the network 160 and communicate with the computer 102 through the interface circuit 158.

Figure 4:
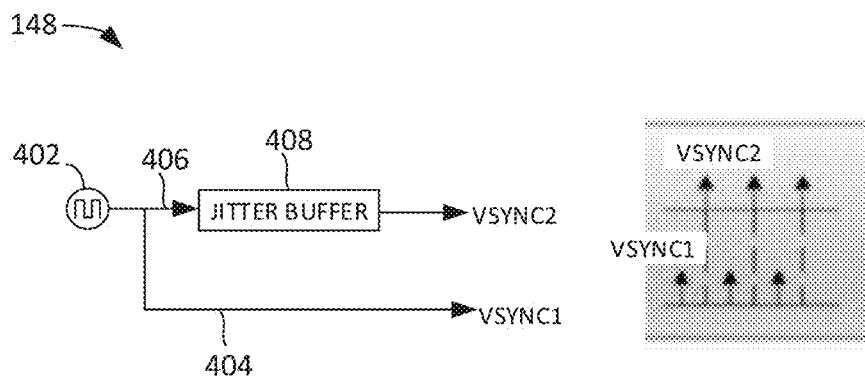
FIG. 4 is a schematic illustration of an example clock logic that may be implemented as an example vertical synchronization (VSYNC) scheduler of the example computer of FIG. 1.

FIG. 4 is a schematic illustration of an example implementation of the VSYNC scheduler 148 that is used to generate the alternating VSYNC1 and VSYNC2 signals. In this example, the example VSYNC scheduler 148 of FIG. 4 includes an oscillator or clock 402. The clock 402 is external to the display clocks of the first and second HMDs 104, 106. The clock 402 generates pairs of the VSYNC1 and VSYNC2 signals simultaneously at a particular frequency, such as 60 Hz (i.e., one VSYNC1 signal and one VSYNC2 signal are generated every 16 ms). The VSYNC1 signal is transmitted via a first line 404 to the GPU 122 (FIG. 1) and the VSYNC2 signal is transmitted via a second line 406 to the GPU 122 (FIG. 1). In other examples, the VSYNC1 and VSYNC2 signals may be transmitted over the same line. To create the interleaving or alternating effect, the VSYNC2 signal is transmitted through a jitter buffer 408, which delays the transmission of the VSYNC2 signal by a half cycle. For example, if the VSYNC1 and VSYNC2 signals are transmitted every 16 ms (60 Hz), the jitter buffer 408 delays the transmission of the VSYNC2 signal by 8 ms, such that the resulting VSYNC1 and VSYNC2 signals are staggered or alternating, as shown in the image to the right in FIG. 4.

The clock 402 can be set to any desired frequency. In some examples, the display engine 126 and/or the VSYNC scheduler 148 determine and set the frequency based on the refresh rates of the first and second HMDs 104, 106. For example, if the refresh rate of the first and second HMDs 104, 106 is 60 Hz, the clock 402 is configured to generate the VSYNC signals at 60 Hz. In such an example, the VSYNC2 signals are delayed by a half cycle (8 ms) compared to the VSYNC1 signals, which creates the effect of transmitting the alternating VSYNC1 and VSYNC2 signals at a frequency of 120 Hz. While in this example the clock logic 400 is implemented as hardware, in other examples, the clock logic 400 can be implemented by software executed by the display engine 126 and/or the VSYNC scheduler 148 to send alternating VSYNC signals to the GPU 122.

While an example manner of implementing the computer 102 is illustrated in FIG. 1, one or more of the elements, processes and/or devices illustrated in FIG. 1 may be combined, divided, re-arranged, omitted, eliminated and/or implemented in any other way. Further, the example computer wireless transceiver 113, the example game engine 117, the example CPU 120, the example GPU renderer 121, the example GPU 122, the example time warping, distortion corrector 123, the example display engine 126, the example first compositor 136, the example second compositor 138, the example VSYNC scheduler 148, the example interface circuit 158 and/or, more generally, the example computer 102 of FIG. 1 may be implemented by hardware, software, firmware and/or any combination of hardware, software and/or firmware. Thus, for example, any of the example computer wireless transceiver 113, the example game engine 117, the example CPU 120, the example GPU renderer 121, the example GPU 122, the example time warping, distortion corrector 123, the example display engine 126, the example first compositor 136, the example second compositor 138, the example VSYNC scheduler 148, the example interface circuit 158 and/or, more generally, the example computer 102 could be implemented by one or more analog or digital circuit(s), logic circuits, programmable processor(s), programmable controller(s), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example the example computer wireless transceiver 113, the example game engine 117, the example CPU 120, the example GPU renderer 121, the example GPU 122, the example time warping, distortion corrector 123, the example display engine 126, the example first compositor 136, the example second compositor 138, the example VSYNC scheduler 148, and/or the example interface circuit 158 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computer 102 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
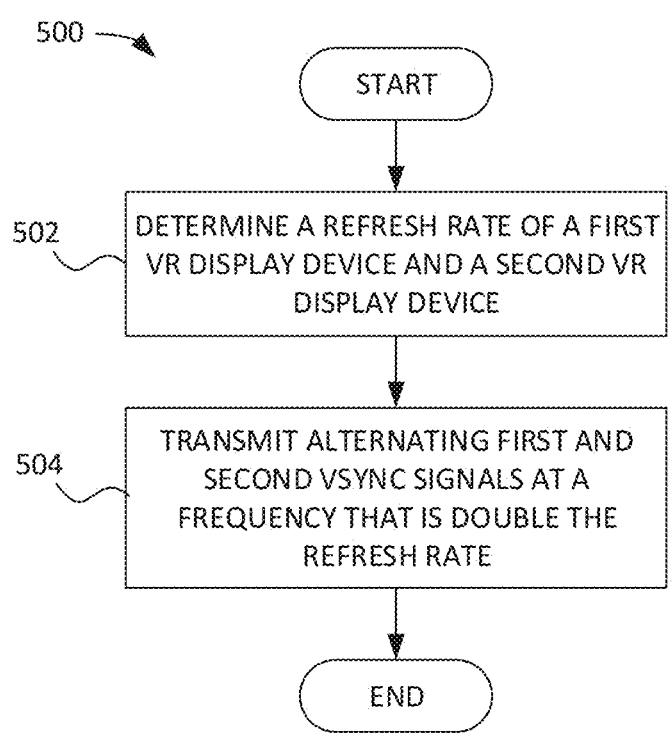
FIG. 5 is a flowchart representative of machine readable instructions that may be executed to implement an example VSYNC scheduler of the example computer of FIG. 1.
Figure 6:
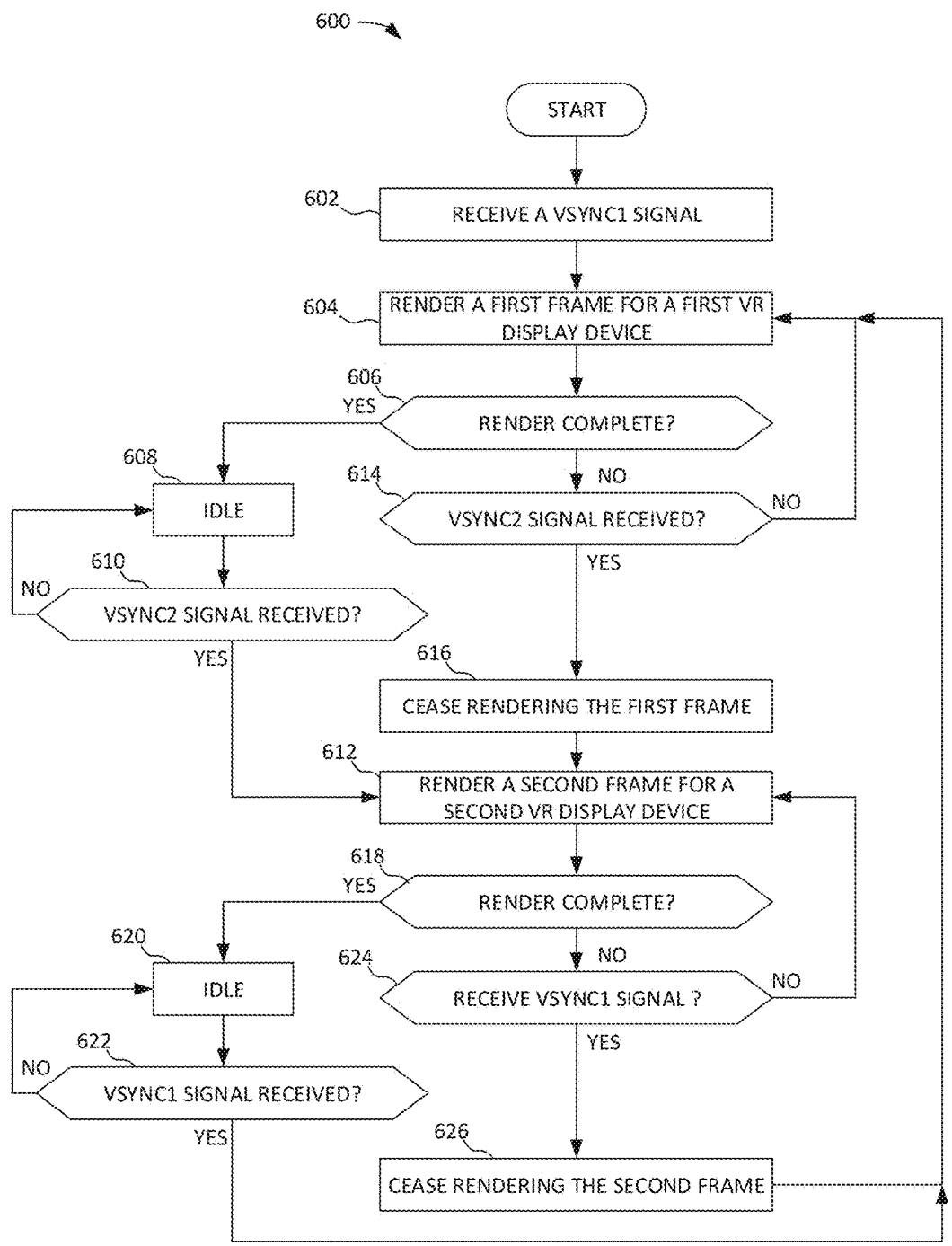
FIG. 6 is a flowchart representative of machine readable instructions that may be executed to implement an example GPU of the example computer of FIG. 1.

Flowcharts representative of example hardware logic, machine readable instructions, hardware implemented state machines, and/or any combination thereof for implementing the computer 102 of FIG. 1 are shown in FIGS. 5 and 6. The machine readable instructions may be an executable program or portion of an executable program for execution by a computer processor, such as the example computer wireless transceiver 113, the example game engine 117, the example CPU 120, the example GPU renderer 121, the example GPU 122, the example time warping, distortion corrector 123, the example display engine 126, the example first compositor 136, the example second compositor 138, the example VSYNC scheduler 148, the example interface circuit 158 and/or, more generally, the computer 102 discussed in connection with FIG. 1. The program may be embodied in software stored on a non-transitory computer readable storage medium such as a CD-ROM, a floppy disk, a hard drive, a DVD, a Blu-ray disk, or a memory associated with the processor the example computer wireless transceiver 113, the example game engine 117, the example CPU 120, the example GPU renderer 121, the example GPU 122, the example time warping, distortion corrector 123, the example display engine 126, the example first compositor 136, the example second compositor 138, the example VSYNC scheduler 148, and/or the example interface circuit 158 but the entire program and/or parts thereof could alternatively be executed by a device other than the processor the example computer wireless transceiver 113, the example game engine 117, the example CPU 120, the example GPU renderer 121, the example GPU 122, the example time warping, distortion corrector 123, the example display engine 126, the example first compositor 136, the example second compositor 138, the example VSYNC scheduler 148, the example interface circuit 158 and/or embodied in firmware or dedicated hardware. Further, although the example program is described with reference to the flowcharts illustrated in FIGS. 5 and 6, many other methods of implementing the example computer 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5 and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 5 is a flowchart 500 representative of example machine readable instructions that may be executed by the example VSYNC scheduler 148. At block 502, the VSYNC scheduler 148 determines the refresh rates of the first HMD 104 and the second HMD 106. The VSYNC scheduler 148 may retrieve the refresh rates from the display engine 126. In some examples, to enable the GPU 122 to render frames at a sufficient rate for the first and second HMDs 104, 106, the VSYNC scheduler 148 is to transmit alternating VSYNC1 and VSYNC2 signals at a frequency that is double the refresh rate of the first and second HMDs 104, 106, at block 504. The VSYNC scheduler 148 automatically and continuously transmits the alternating VSYNC1 and VSYNC2 signals at the determined frequency, which causes the GPU 122 to alternate, at the same frequency, between rendering a frame for the first HMD 104 and rendering a frame for the second HMD 106.

In some examples, when initially stating the first and second HMDs 104, 106, the VSYNC scheduler 148 delays the start or first refresh of one of the first or second HMDs 104, 106 by a half cycle (e.g., by 8 ms), such that the refresh timing of the first and second HMDs 104, 106 are staggered (and, thus, aligned with the alternating VSYNC1 and VSYNC2 signals that are also staggered). As a result, the refresh timing for the first HMD 104 and the timing of the VSYNC1 signals are aligned, and the refresh timing for the second HMD 106 and the timing of the VSYNC2 signals are aligned. In some examples, the VSYNC scheduler 148 determines the refresh rate of the first and second HMDs 104, 106 (e.g., by executing an instruction) and then sets the clock 402 (FIG. 4) to the same frequency, which results in sending the staggered VSYNC1 and VSYNC2 signals at double the frequency of the refresh rate.

FIG. 6 is a flowchart 600 representative of example machine readable instructions that may be executed by the example GPU 122. The instructions, when executed, cause the GPU 122 to alternate between rendering frames for a first virtual reality (VR) display device and rendering frames for second VR display device based on alternating first and second VSYNC signals received by the GPU 122 from the display engine 126 (e.g., from the VSYNC scheduler 148) of the computer 102. The alternating VSYNC1 and VSYNC2 signals are received at a constant frequency such that a time period between each of the VSYNC1 or VSYNC2 signals and a subsequent one of the VSYNC1 or VSYNC2 signals is substantially the same (e.g., 8 ms±0.1 ms). As such, the GPU 122 alternates between rendering frames for the first HMD 104 during first time slots and rendering frames for the second HMD 106 during second time slots, where each of the first time slots is a same amount of time as each of the second time slots. Therefore, in this example, the GPU 122 provides means for alternating between rendering frames for the first HMD 104 and rendering frames for the second HMD 106 based on alternating first and second VSYNC received from the display engine 126.

At block 602, the GPU 122 receives a VSYNC1 signal from the VSYNC scheduler 148. The VSYNC scheduler 148 transmits the alternating VSYNC1 and VSYNC2 signals at a particular frequency. Once the GPU 122 receives the VSYNC1 signal, at block 604, the GPU 122 begins rendering a first frame for the first HMD 104. For example, the GPU renderer 121 renders the first frame and the time warping, distortion corrector 123 performs post-processing on the first frame. This may occur at T1 from FIGS. 2 and 3, for example. The GPU 122 saves the first frame being rendered to one of the first front or back buffers 140, 142 of the first buffer 132.

At block 606, the GPU 122 determines whether the first frame is finished being rendered. If the GPU 122 is finished rendering the first frame, the GPU 122 remains idle, at block 608, and waits to receive a next VSYNC signal, such as a VSYNC2 signal. At block 610, the GPU 122 checks whether the VSYNC2 signal has been received. If not, the GPU 122 remains idle at block 608. Once the VSYNC2 signal is received, the GPU 122, at block 612, begins rendering a second frame for the second HMD 106. This may occur at T2 of FIG. 2, for example.

Referring back to block 606, if the GPU 122 determines the render is not complete, the GPU 122, at block 614, checks whether the VSYNC2 signal has been received. If not, control returns to block 604, and the GPU 122 continues rendering the first frame and monitoring for the VSYNC2 signal. This cycle may occur at a relatively high processing rate until the first frame is rendered.

However, if the GPU 122 has not finished rendering the first frame (determined at block 606) but the VSYNC2 signal has been received (determined at block 614), at block 616, the GPU 122 ceases rendering the first frame for the first HMD 104. This may occur at T2 of FIG. 3, for example. At block 612, the GPU 122 begins rendering a second frame for the second HMD 106. For example, the GPU renderer 121 renders the second frame and the time warping, distortion corrector 123 performs post-processing on the second frame. The GPU 122 saves the second frame being rendered to one of the second front or back buffers 144, 146 of the second buffer 134.

At block 618, the GPU 122 determines whether the second frame is finished being rendered. If the GPU 122 is finished rendering the second frame, the GPU 122 remains idle, at block 620, and waits to receive the next VSYNC1 signal. At block 622, the GPU 122 checks whether the next VSYNC1 signal has been received. If not, the GPU 122 remains idle (block 620). Once the next VSYNC1 signal is received (e.g., which may occur at T3 from FIGS. 2 and 3), the GPU 122, at block 604, begins rendering the next frame for the first HMD 104. If the GPU 122 did not finish rendering the first (previous) frame for the first HMD 104, the GPU 122 may continue rendering the same frame at this time. Otherwise, a new frame is rendered for the first HMD 104.

Referring back to block 618, if the GPU 122 determines the render is not complete, the GPU 122, at block 624, checks whether the next VSYNC1 signal has been received. If not, control returns to block 612, and the GPU 122 continues rendering the second frame and monitoring for the next VSYNC1 signal. This cycle may occur at a relatively high processing rate until the second frame is rendered.

However, if the GPU 122 has not finished rendering the second frame but the next VSYNC1 signal has been received, at block 626, the GPU 122 ceases rendering the second frame. At block 604, the GPU 122 begins rendering a second frame for the second HMD 106. This may occur at T3 from FIGS. 2 and 3, for example. The example process of FIG. 6 may continue until the VR system 100 is shut down or turned off.

The following paragraphs provide various examples of the examples disclosed herein.

Example 1 includes a computer for supporting multiple virtual reality (VR) display devices. The computer comprising a graphics processing unit (GPU) to render frames for a first VR display device and a second VR display device, a memory to store frames rendered by the GPU for the first VR display device and the second VR display device, and a vertical synchronization (VSYNC) scheduler to transmit alternating first and second VSYNC signals to the GPU such that a time period between each of the first or second VSYNC signals and a subsequent one of the first or second VSYNC signals is substantially the same. The GPU is to, based on the first and second VSYNC signals, alternate between rendering a frame for the first VR display device and a frame for the second VR display device.

Example 2 includes the computer of Example 1, wherein the first and second VR display devices have a same refresh rate, and the VSYNC scheduler is to transmit the alternating first and second VSYNC signals at a frequency that is double the refresh rate.

Example 3 includes the computer of Examples 1 or 2, wherein the VSYNC scheduler includes a clock that generates pairs of the first and second VSYNC signals simultaneously. The VSYNC scheduler further includes a jitter buffer to delay transmission of the second VSYNC signals by a half cycle compared to the first VSYNC signals.

Example 4 includes the computer of any of Examples 1-3, wherein, if the GPU finishes rendering a frame for the first VR display device before a subsequent one of the second VSYNC signals is received, the GPU is to enter an idle state.

Example 5 includes the computer of any of Examples 1-4, wherein, if the GPU is not finished rendering a frame for the first VR display device when one of the second VSYNC signals is received, the GPU is to cease rendering the frame for the first VR display device and resume rendering the frame for the first VR display device when a next one of the first VSYNC signals is received.

Example 6 includes the computer of any of Examples 1-5, further including a display engine. The VSYNC scheduler is implemented by the display engine.

Example 7 includes the computer of any of Examples 1-6, wherein the memory includes a first front buffer and a first back buffer for the first VR display device and a second front buffer and a second back buffer for the second VR display device. The GPU is to save frames for the first VR display device in an alternating manner in the first front and back buffers, and the GPU is to save frames for the second VR display device in an alternating manner in the second front and back buffers.

Example 8 includes the computer of any of Examples 1-7, further including a central processing unit (CPU) communicatively coupled to the GPU. The CPU is to receive and process data corresponding to a virtual reality environment.

Example 9 includes the computer of any of Examples 1-8, further including a wireless transceiver to transmit frames to the first and second VR display devices via a wireless communication protocol.

Example 10 includes the computer of any of Examples 1-9, wherein the first VR display device is a different type of VR display device than the second VR display device.

Example 11 includes a non-transitory computer readable storage device comprising instructions that, when executed, cause a graphics processing unit (GPU) of a computer to at least alternate between rendering frames for a first virtual reality (VR) display device and rendering frames for second VR display device based on alternating first and second vertical synchronization (VSYNC) signals received by the GPU from a display engine of the computer. The first and second VSYNC signals are received such that a time period between each of the first or second VSYNC signals and a subsequent one of the first or second VSYNC signals is substantially the same.

Example 12 includes the non-transitory computer readable storage device of Example 11, wherein, the instructions, when executed, cause the GPU to enter an idle state if the GPU finishes rendering a frame for one of the first or second VR display devices before a next one of the first or second VSYNC signals is received.

Example 13 includes the non-transitory computer readable storage device of Examples 11 or 12, wherein, the instructions, when executed, cause the GPU to cease rendering a frame for the first VR display device if one of the second VSYNC signals is received before the GPU finishes rendering the frame for the first VR display device and resume rendering the frame for the first VR display device when a next one of the first VSYNC signals is received.

Example 14 includes the non-transitory computer readable storage device of Example 13, wherein, the instructions, when executed, cause the GPU to cease rendering a frame for the second VR display device if one of the first VSYNC signals is received before the GPU finishes rendering the frame for the second VR display device and resume rendering the frame for the second VR display device when a next one of the second VSYNC signals is received.

Example 15 includes the non-transitory computer readable storage device of any of Examples 11-14, wherein the first and second VR display devices have a same refresh rate, and wherein the first and second VSYNC signals are received at a frequency that is double the refresh rate.

Example 16 includes a method including alternating, via a graphics processing unit (GPU) of a computer, between rendering frames for a first head-mounted display (HMD) during first time slots and rendering frames for a second HMD during second time slots, wherein each of the first time slots is substantially a same amount of time as each of the second time slots.

Example 17 includes the method of Example 16, further including transmitting, from a vertical synchronization (VSYNC) scheduler of the computer, alternating first and second VSYNC signals to the GPU at a frequency, wherein the GPU is to render a frame for the first HMD when one of the first VSYNC signals is received and render a frame for the second HMD when one of the second VSYNC signals is received.

Example 18 includes the method of Example 17, further including determining, via the VSYNC scheduler, a refresh rate of the first and second HMDs.

Example 19 includes the method of Example 18, wherein the frequency is double the refresh rate, such that the GPU renders frames for the first HMD at the refresh rate of the first HMD and renders frames for the second HMD at the refresh rate of the second HMD.

Example 20 includes the method of any of Examples 16-19, wherein the computer is a personal computer or a gaming console.

Example 21 includes computer for supporting multiple virtual reality (VR) display devices, the computer including means for alternating between rendering frames for a first virtual reality (VR) display device and rendering frames for second VR display device based on alternating first and second vertical synchronization (VSYNC) signals received from a display engine. The first and second VSYNC signals are received such that a time period between each of the first or second VSYNC signals and a subsequent one of the first or second VSYNC signals is substantially the same.

Example 22 includes the computer of Example 21, wherein the means for alternating is to enter an idle state if the means for alternating finishes rendering a frame for one of the first or second VR display devices before a next one of the first or second VSYNC signals is received.

Example 23 includes the computer of Example 21, wherein the means for alternating is to cease rendering a frame for the first VR display device if one of the second VSYNC signals is received before the GPU finishes rendering the frame for the first VR display device, and resume rendering the frame for the first VR display device when a next one of the first VSYNC signals is received.

Example 24 includes the computer of Example 21, wherein the means for alternating is to cease rendering a frame for the second VR display device if one of the first VSYNC signals is received before the GPU finishes rendering the frame for the second VR display device, and means for rendering the frame for the second VR display device when a next one of the second VSYNC signals is received.

Example 25 includes the computer of any of Examples 21-24, wherein the first and second VR display devices have a same refresh rate, and wherein the first and second VSYNC signals are received at a frequency that is double the refresh rate.

From the foregoing, it will be appreciated that example methods, apparatus, systems, and articles of manufacture have been disclosed that enable a GPU of a computer to support multiple VR display devices. VR display devices often operate at higher refresh rates (e.g., 120 Hz) and often demand higher workload from a GPU. The disclosed methods, apparatus, systems, and articles of manufacture improve the efficiency of using a GPU to support dual VR display devices by interleaving or alternating VSYNC signals, which enables the GPU to spend sufficient time rendering images for each of the VR display devices. The disclosed methods, apparatus, and system, and articles of manufacture are accordingly directed to one or more improvement(s) in the functioning of a computer.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A computer for supporting multiple virtual reality (VR) display devices, the computer comprising:
   a graphics processing unit (GPU) to render frames for a first VR display device and a second VR display device, the first VR display device and the second VR display device having a same refresh rate;
   a memory to store frames rendered by the GPU for the first VR display device and the second VR display device; and
   a vertical synchronization (VSYNC) scheduler to transmit alternating first and second VSYNC signals to the GPU such that a first time period between each of the first VSYNC signals and a subsequent one of the second VSYNC signals is substantially the same as a second time period between each of the second VSYNC signals and a subsequent one of the first VSYNC signals, the VSYNC scheduler to transmit the alternating first and second VSYNC signals at a frequency that is double the refresh rate, the GPU to, based on the first and second VSYNC signals, alternate between rendering a frame for the first VR display device and a frame for the second VR display device.

2. The computer of claim 1, wherein, if the GPU finishes rendering a frame for the first VR display device before a subsequent one of the second VSYNC signals is received, the GPU is to enter an idle state.

3. The computer of claim 1, further including a display engine, the VSYNC scheduler implemented by the display engine.

4. The computer of claim 1, wherein the memory includes a first front buffer and a first back buffer for the first VR display device and a second front buffer and a second back buffer for the second VR display device, the GPU to save frames for the first VR display device in an alternating manner in the first front and back buffers, and the GPU is to save frames for the second VR display device in an alternating manner in the second front and back buffers.

5. The computer of claim 1, further including a central processing unit (CPU) communicatively coupled to the GPU, the CPU to receive and process data corresponding to a virtual reality environment.

6. The computer of claim 1, further including a wireless transceiver to transmit frames to the first and second VR display devices via a wireless communication protocol.

7. The computer of claim 1, wherein the first VR display device is a different type of VR display device than the second VR display device.

8. The computer of claim 1, wherein the VSYNC scheduler includes:
 a clock to generate pairs of the first and second VSYNC signals simultaneously; and
 a jitter buffer to delay transmission of the second VSYNC signals by a half cycle compared to the first VSYNC signals.

9. The computer of claim 1, wherein, if the GPU is not finished rendering a frame for the first VR display device when one of the second VSYNC signals is received, the GPU is to cease rendering the frame for the first VR display device and resume rendering the frame for the first VR display device when a next one of the first VSYNC signals is received.

10. A computer for supporting multiple virtual reality (VR) display devices, the computer comprising:
 a graphics processing unit (GPU) to render frames for a first VR display device and a second VR display device;
 a memory to store frames rendered by the GPU for the first VR display device and the second VR display device; and
 a vertical synchronization (VSYNC) scheduler to transmit alternating first and second VSYNC signals to the GPU such that a first time period between each of the first VYSNC signals and a subsequent one of the second VSYNC signals is substantially the same as a second time period between each of the second VSYNC signals and a subsequent one of the first VSYNC signals, the VSYNC scheduler including a clock that generates pairs of the first and second VSYNC signals simultaneously and a jitter buffer to delay transmission of the second VSYNC signals by a half cycle compared to the first VSYNC signals, the GPU to, based on the first and second VSYNC signals, alternate between rendering a frame for the first VR display device and a frame for the second VR display device.

11. A computer for supporting multiple virtual reality (VR) display devices, the computer comprising:
 a graphics processing unit (GPU) to render frames for a first VR display device and a second VR display device;
 a memory to store frames rendered by the GPU for the first VR display device and the second VR display device; and
 a vertical synchronization (VSYNC) scheduler to transmit alternating first and second VSYNC signals to the GPU such that a first time period between each of the first VYSNC signals and a subsequent one of the second VSYNC signals is substantially the same as a second time period between each of the second VSYNC signals and a subsequent one of the first VSYNC signals, the GPU to, based on the first and second VSYNC signals, alternate between rendering a frame for the first VR display device and a frame for the second VR display device, wherein, if the GPU is not finished rendering a frame for the first VR display device when one of the second VSYNC signals is received, the GPU is to cease rendering the frame for the first VR display device and resume rendering the frame for the first VR display device when a next one of the first VSYNC signals is received.

12. A non-transitory computer readable storage device comprising instructions that, when executed, cause a graphics processing unit (GPU) of a computer to at least:
 alternate between rendering frames for a first virtual reality (VR) display device and rendering frames for a second VR display device based on alternating first and second vertical synchronization (VSYNC) signals received by the GPU from a display engine of the computer, the first and second VSYNC signals are received such that a time period between each of the first or second VSYNC signals and a subsequent one of the first or second VSYNC signals is substantially the same, the first and second VR display devices having a same refresh rate, and the first and second VSYNC signals being received at a frequency that is double the refresh rate.

13. The non-transitory computer readable storage device of claim 12, wherein, the instructions, when executed, cause the GPU to enter an idle state if the GPU finishes rendering a frame for one of the first or second VR display devices before a next one of the first or second VSYNC signals is received.

14. The non-transitory computer readable storage device of claim 12, wherein, the instructions, when executed, cause the GPU to:
 cease rendering a frame for the first VR display device if one of the second VSYNC signals is received before the GPU finishes rendering the frame for the first VR display device; and
 resume rendering the frame for the first VR display device when a next one of the first VSYNC signals is received.

15. The non-transitory computer readable storage device of claim 14, wherein, the instructions, when executed, cause the GPU to:
 cease rendering a frame for the second VR display device if one of the first VSYNC signals is received before the GPU finishes rendering the frame for the second VR display device; and
 resume rendering the frame for the second VR display device when a next one of the second VSYNC signals is received.

16. A non-transitory computer readable storage device comprising instructions that, when executed, cause a graphics processing unit (GPU) of a computer to at least:
 alternate between rendering frames for a first virtual reality (VR) display device and rendering frames for a second VR display device based on alternating first and second vertical synchronization (VSYNC) signals received by the GPU from a display engine of the computer, the first and second VSYNC signals are received such that a time period between each of the first or second VSYNC signals and a subsequent one of the first or second VSYNC signals is substantially the same;

cease rendering a frame for the first VR display device if one of the second VSYNC signals is received before the GPU finishes rendering the frame for the first VR display device; and resume rendering the frame for the first VR display device when a next one of the first VSYNC signals is received.

17. The non-transitory computer readable storage device of claim 16, wherein the instructions, when executed, cause the GPU to:

cease rendering a frame for the second VR display device if one of the first VSYNC signals is received before the GPU finishes rendering the frame for the second VR display device; and resume rendering the frame for the second VR display device when a next one of the second VSYNC signals is received.

18. A method comprising:

determining, via a vertical synchronization (VSYNC) scheduler of a computer, a refresh rate of a first head-mounted display (HMD) and a second HMD;

transmitting, from the VSYNC scheduler, alternating first and second VSYNC signals to a graphics processing unit (GPU) of the computer at a frequency; and alternating, via the GPU, between rendering frames for the first HMD during first time slots and rendering frames for the second HMD during second time slots, wherein each of the first time slots is substantially a same amount of time as each of the second time slots, wherein the GPU is to render a frame for the first HMD when one of the first VSYNC signals is received and render a frame for the second HMD when one of the second VSYNC signals is received, and wherein the frequency is double the refresh rate, such that the GPU renders frames for the first HMD at the refresh rate of the first HMD and renders frames for the second HMD at the refresh rate of the second HMD.

19. The method of claim 18, wherein the computer is a personal computer or a gaming console.

20. The method of claim 18, further including:

ceasing rendering a frame for the first HMD if one of the second VSYNC signals is received before the GPU finishes rendering the frame for the first HMD; and resuming rendering the frame for the first HMD when a next one of the first VSYNC signals is received.

* * * * *